Aug. 2, 1960 P. L. LAAGEWAARD 2,947,582
LIGHT METAL PISTON WITH PLATED HEAD
Filed Oct. 23, 1958
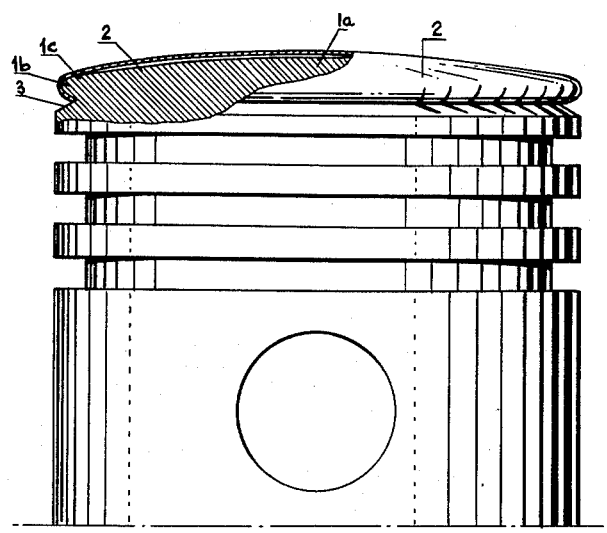
Paul L. LAAGEWAARD
*INVENTOR.*
BY Wenderoth, Lind & Ponack
Attys United States Patent Office 2,947,582
Patented Aug. 2, 1960

2,947,582

LIGHT METAL PISTON WITH PLATED HEAD

Paul Leonel Laagewaard, 1a Raamstraat,
The Hague, Netherlands

Filed Oct. 23, 1958, Ser. No. 769,179

2 Claims. (Cl. 309—9)

The invention relates to a combustion engine piston made of light metal and provided with a protective plate secured to the piston head and extending over the entire surface thereof.

In the known construction a rather thick, rigid, flat protective plate is arranged on the similarly flat piston head by means of ribs forming an integral part of the protective plate, said ribs being pressed into grooves provided in the piston head. In consequence of the unequal expansion of the two different kinds of metal considerable stresses occur both in the protective plate and in the piston head while the engine is running.

The purpose of the invention is to remove this drawback. According to the invention this is achieved by the fact that both the resilient protective plate and the piston head are of slightly convex shape with the same or approximately the same radius of curvature and with their convex side facing away from the piston pin, said protective plate being secured in position by means of a flanged edge which in mounted condition grips around the edge of the piston head.

As a result of these measures the protective plate and the piston head are capable of expanding more or less independently of each other. Moreover, the method of mounting the protective plate is simpler and more convenient than in the case of the known piston.

It is further pointed out that there is a known piston for a combustion engine in which the flat piston head is coated with a small layer of insulating material which is held onto it by a thin metal plate secured to the piston by means of a flanged edge which grips around the edge of the piston head. This metal plate therefore does not serve here as a protective plate, but primarily as a holding plate for the insulating material. Moreover, in this known construction the piston is not made of light metal.

The figure represents by way of example a piston provided with a protective plate shown partly in cross-section and partly as a side view. The upper surface 1a of the piston is of slightly arched shape. The edge is rounded at 1b and passes into a groove 3 in such a way that there remains sufficient thickness at 1a to be able to resist the stresses occurring in the groove 3 while the protective plate or cap 2 is secured and tightened into position.

Said cap and the piston head have the same slightly arched shape so that when the edge of the cap has been secured along the rounded edge of the piston, said cap fits as tightly as possible onto the piston head.

The steel cap, which is tightly secured onto the piston head, reduces the heat absorption by the piston due to the cap being less heat-conductive and therefore absorbing less heat from the burnt gases.

The latter effect is further enhanced by the tiny air layer provided between said cap and said piston, said air layer having a heat-insulating effect whereby heat absorption by the piston is counteracted.

I claim:

1. A piston made of light metal and designed for a combustion engine comprising a resilient protective plate secured to the piston head and extending over the entire surface thereof, said resilient protective plate and the piston head being of slightly convex shape having approximately the same radius of curvature and with their convex sides facing away from the piston pin, said protective plate being secured in position by means of a flanged edge which in mounted condition grips around the edge of the piston head with a slight air layer between said piston head and plate.

2. A piston made of light metal for a combustion engine comprising a steel protective plate secured to the piston head and extending over the entire surface thereof, said plate and the piston head being of slightly convex shape having approximately the same radius of curvature and with their convex sides facing away from the piston pin, said protective plate being secured in position by means of a flanged edge which in mounted condition grips around the edge of the piston head with a slight air layer between said piston head and plate.

References Cited in the file of this patent

UNITED STATES PATENTS

| 1,386,766 | Centervall | Aug. 9, 1921 |
|---|---|---|
| 1,513,272 | Pourroy | Oct. 28, 1924 |
| 2,159,402 | Retschy | May 23, 1939 |
| 2,194,097 | Reggio | Mar. 19, 1940 |

FOREIGN PATENTS

| 423,410 | Great Britain | Jan. 31, 1935 |